(12) United States Patent
Dillon et al.

(10) Patent No.: US 8,904,372 B2
(45) Date of Patent: Dec. 2, 2014

(54) DIALOG TO SERVICE CONVERSION METHOD AND SYSTEM

(75) Inventors: David Alan Dillon, Norfolk, MA (US);
David C. Ross, Quincy, MA (US);
David Edward Hearn, Wilmington, DE (US)

(73) Assignee: CA, Inc., Islandia, NY (US)

( * ) Notice: Subject to any disclaimer, the term of this patent is extended or adjusted under 35 U.S.C. 154(b) by 614 days.

(21) Appl. No.: 13/283,993

(22) Filed: Oct. 28, 2011

(65) Prior Publication Data

US 2013/0111504 A1 May 2, 2013

(51) Int. Cl.
*G06F 9/45* (2006.01)
*G06F 9/54* (2006.01)

(52) U.S. Cl.
CPC . *G06F 9/547* (2013.01); *G06F 8/40* (2013.01)
USPC .......................................................... 717/159

(58) Field of Classification Search
CPC .......................................................... G06F 8/40
USPC .......................................................... 717/159
See application file for complete search history.

(56) References Cited

U.S. PATENT DOCUMENTS

| | | | |
|---|---|---|---|
| 5,758,032 A * | 5/1998 | Sanders | 706/45 |
| 6,343,372 B1 * | 1/2002 | Felty et al. | 717/136 |
| 8,489,474 B2 * | 7/2013 | Crook et al. | 705/35 |
| 8,615,750 B1 * | 12/2013 | Narayana Iyer et al. | 717/159 |
| 8,667,565 B2 * | 3/2014 | Kumar et al. | 726/3 |
| 2002/0023261 A1 * | 2/2002 | Goodwin et al. | 717/146 |
| 2011/0060790 A1 * | 3/2011 | Subramanian et al. | 709/203 |
| 2011/0161940 A1 * | 6/2011 | Brunswig et al. | 717/139 |
| 2012/0131645 A1 * | 5/2012 | Harm | 726/4 |
| 2013/0239098 A1 * | 9/2013 | Ichii et al. | 717/137 |

OTHER PUBLICATIONS

Meshach Baptiste; "Transform 3270 green screens to Web services by using IBM Rational Host Access Transformation Services for Multiplatforms"; IBM.com website; Mar. 2008.*

* cited by examiner

*Primary Examiner* — Qing Chen
*Assistant Examiner* — Clint A Thatcher
(74) *Attorney, Agent, or Firm* — Schwegman Lundberg & Woessner, P.A.

(57) ABSTRACT

A computer implemented system and method includes accessing an application dialog from a computer readable storage device, wherein the application dialog contains process modules having interface operations and business logic. Process module commands are identified via the computer that are invalid for a service and identifying options for remediation of such commands. A completed process module that has invalid commands removed is compiled as a service procedure. A remote procedure definition and a service wrapper interface are created and stored in a computer readable storage device.

18 Claims, 8 Drawing Sheets

─ 600

| PROCEDURE = "EmpProc" |
|---|
| CREATE PROCEDURE DEMOEMPL.EMP_UPDATE<br>(<br>  EMP_ID_SVC          UNSIGNED NUMERIC(8),<br>  EMP_FIRST_NAME_SVC    CHARACTER (20),<br>  EMP_LAST_NAME_SVC     CHARACTER (20),<br>  EMP_SSN_SVC         UNSIGNED NUMERIC(9),<br>  MESSAGE_SVC         CHARACTER (80),<br>  RETURN_CODE_SVC      NUMERIC(4),<br>)<br>  EXTERNAL NAME EMPSERV<br>  PROTOCOL ADS<br>  SYSTEM MODE<br>  LOCAL WORK AREA 0<br>  GLOBAL WORK AREA 0<br>; |

*FIG. 6*

SERVICE WRAPPER = "EmpService"

```
package serviceWrapper;
class EmpService
{
    private Connection conn;
    public void updateEmployee(Employee employee) throws Exception
    {
        try {
            CallableStatement cstmt =
                conn.prepareCall("{CALL DEMOEMPL.EMP_UPDATE(?, ?, ?, ?, ?, ?)}");
            cstmt.setInt("EMP_ID_SVC", employee.getEmpId());
            cstmt.setString("EMP_FIRST_NAME_SVC", employee.getEmpFirstName());
            cstmt.setString("EMP_LAST_NAME_SVC", employee.getEmpLastName());
            cstmt.setInt("EMP_SSN_SVC", employee.getSsNumber());
            cstmt.registerOutParameter("MESSAGE_SVC", Types.CHAR);
            cstmt.registerOutParameter("RETURN_CODE_SVC", Types.NUMERIC);
            cstmt.execute();
            String message = (cstmt.getString("MESSAGE_SVC"));
            Integer rc = (cstmt.getInt("RETURN_CODE_SVC"));
            cstmt.close();
            if (rc != 0)
                throw new Exception(rc.toString() + " " + message);
        }
        catch (SQLException e) {throw new Exception(e);}
    }
}
```

FIG. 7

DIALOG TO SERVICE CONVERSION METHOD AND SYSTEM

BACKGROUND

Over the past 30 plus years, clients have invested countless millions of dollars in the development of customized application solutions that they use to run their businesses. These solutions use traditional 3270-based green screens to interact with the user. With the advent of the web and cloud based solutions, clients now need to be able to access their application data using up-to-date service-oriented protocols. They'd like to maximize their current applications investment, but have found it difficult to "unbind" their applications business logic from the presentation-layer logic embedded in their programs (or dialogs).

SUMMARY

A computer implemented system and method includes accessing an application dialog from a computer readable storage device, wherein the application dialog contains process modules having interface operations and business logic. Process module commands are identified via the computer that are invalid for a service and identifying options for remediation of such commands. A completed process module that has invalid commands removed is compiled as a service procedure. A procedure definition and a service wrapper interface are created and stored in a computer readable storage device.

The method in one embodiment is stored on a computer readable storage device for execution on a computer system.

In a further embodiment, a system includes a process selection manager to access an application dialog from a computer readable storage device, wherein the application dialog contains process modules having interface operations and business logic. A process conversion manager identifies process module commands via the computer that are invalid for a service and identifying options for remediation of such commands. A procedure generator compiles a completed process module that has invalid commands removed as a service procedure and create a remote procedure definition. A wrapper generator creates a service wrapper interface and stores it in a computer readable storage device.

BRIEF DESCRIPTION OF THE DRAWINGS

FIG. 6 illustrates a procedure definition following conversion according to an example embodiment.

FIG. 7 illustrates a service wrapper following conversion according to an example embodiment.

DETAILED DESCRIPTION

Figure 1:
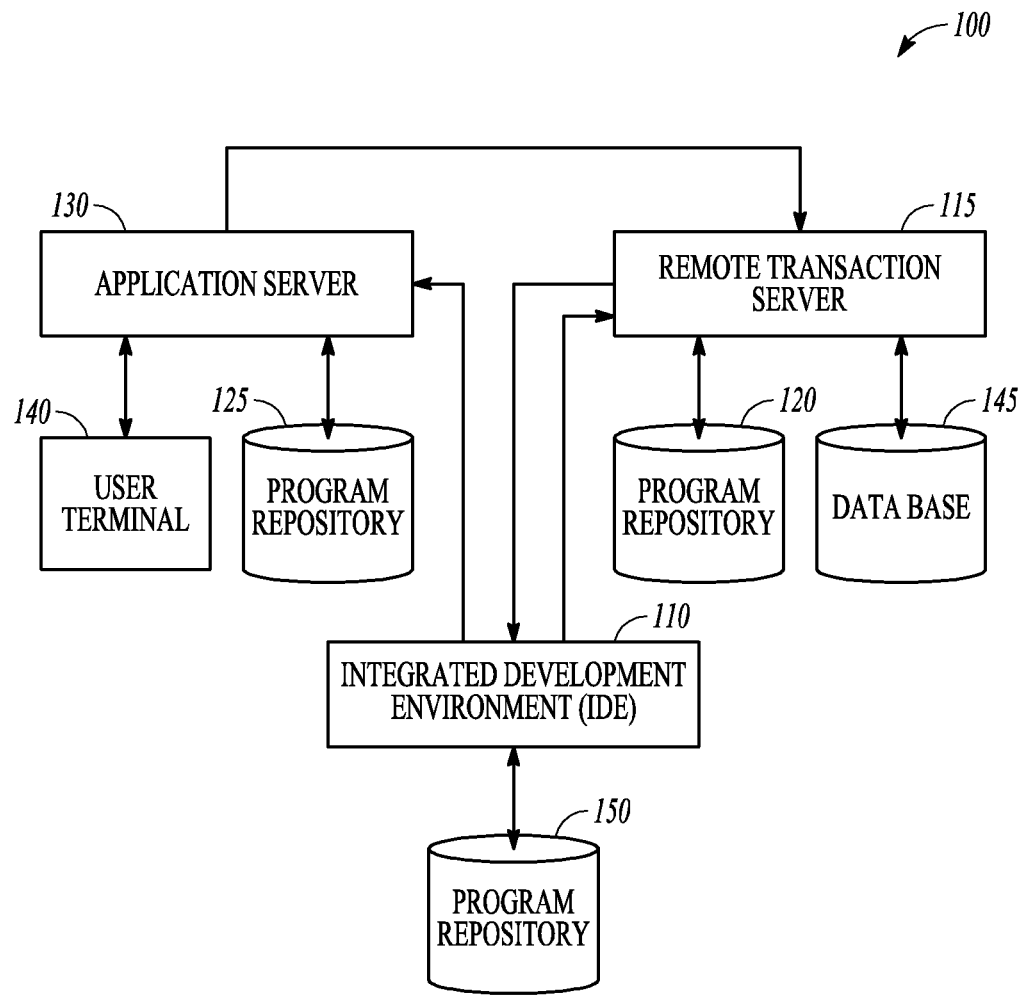
FIG. 1 is a block diagram of a system environment in which dialogs are converted for use with smart terminals according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

A dialog-to-service conversion module in one embodiment is used to modify code designed for use with a dumb terminal through several guided interactions with a user. A dumb terminal is a terminal that has no or minimal processing power, requiring a host to provide application navigation logic and presentation processing to properly display information on a display device of the terminal. A 3270 terminal, referred to as a green screen is one example. A personal computer is known as a smart terminal, and has more intelligence than a dumb terminal. A personal computer can display information with attributes without aid from a host.

In one embodiment, individual code segments (or process modules) to be modified may be programmatically merged. All terminal mapping operations will be identified and eliminated through the interactions. All application navigation logic will be identified and either modified or eliminated. After multiple passes through the code, a new service procedure will be compiled. The conversion module will generate a procedure definition in one embodiment, which will expose the service procedure for invocation, as well as an invocation wrapper class, which can be used to actually invoke the new service procedure over a network connection as a callable web service.

The process of "unbinding" a dialog's business logic from the presentation-layer logic is difficult, tedious and prone to error. There were no tools to automate this process. To further complicate matters, finding experienced ADS programmers is becoming more and more difficult, making this type of conversion even more challenging.

A system 100 in FIG. 1 facilitates unbinding a dialog's business logic from the presentation-layer logic. System 100 creates and displays a list of process modules associated with an interactive dialog that contains business logic. A user selects the process modules to be included in a new remote procedure referred to as a 'service procedure'. Note that a dialog is typically comprised of several process modules.

An integrated development environment 110 downloads the selected process modules via a remote transaction server 115 from a repository 120 and displays them in a graphical text editor in the client integrated development environment 110.

The integrated development environment 110 guides the user through a series of editing steps to remove the user interface operations from the process code and combine the business logic into a new process module. The integrated development environment 110 will highlight each command identified as being invalid for a service, and provide options for remediation by the user. Invalid commands would include those that display and accept user input interactively and transfer control out of the scope of the processing module.

The integrated development environment 110 stores the completed process module in repository 120 of remote transaction server 115, and compiles it as a new 'Service Procedure'. If the new Service procedure is compiled successfully the integrated development environment 110 generates a remote procedure definition, which is stored in the transaction server repository 120, and a service wrapper interface, which is stored in an IDE repository 150. The service wrapper interface would then be deployed into the application server repository 125 by the user.

A user may use the IDE 110 to create a service implementation that invokes the service wrapper interface. The user would then deploy the service implementation into the application server repository 125 by the user.

When the service implementation is invoked via a user terminal 140 connected to the application server container 130, it uses the service wrapper interface in repository 125 to call the remote procedure in a database 145 of the remote transaction server 115. The IDE 110 is not used when the service is invoked.

Figure 2:
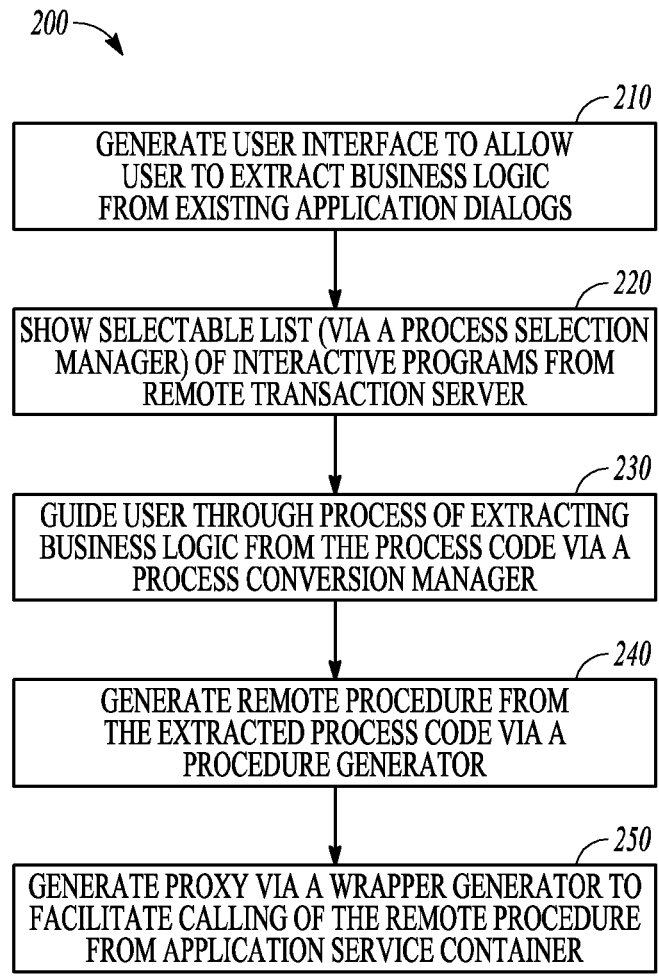
FIG. 2 is a flowchart illustrating a method of converting dialogs into remote procedures according to an example embodiment.

FIG. 2 is a flowchart of a method 200 for unbinding a dialog's business logic from the presentation-layer logic in a systematic, easy to use manner. In one embodiment, a processing system executes instructions to generate a user interface at 210, through which a user can extract business logic from existing interactive application dialogs that run on a remote transaction server, for re-use as remote procedures called by services that run in an application server container. The processing system executes a method containing modules.

At 220, a process selection manager module or set of functions facilitates the display and selection of the interactive program containing the business logic from the remote transaction server. A process conversion manager module or set of functions at 230 guides the user through the process of extracting the business logic from the interactive program's process code.

A procedure generator module or set of functions at 240 generates the remote procedure on the remote transaction server from the extracted process code.

A wrapper generator module or set of functions at 250 generates a proxy that facilitates calling the remote procedure from the service implementation in the Application Server container.

Figure 3:
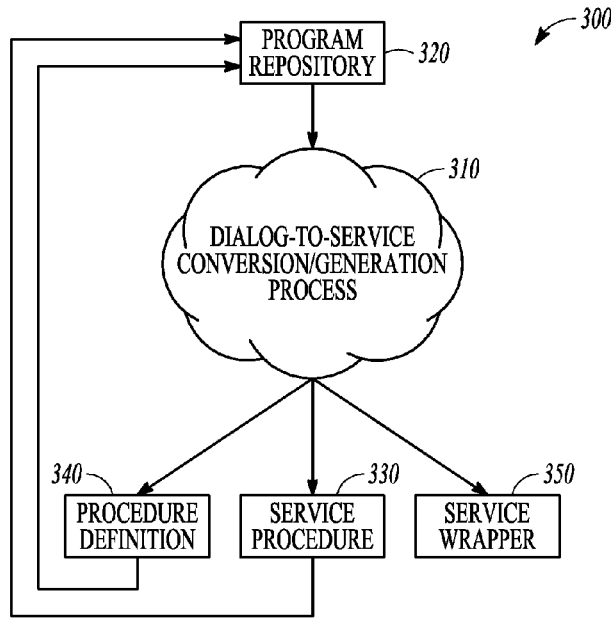
FIG. 3 is a high level architecture block diagram of a dialog to service conversion and generation process according to an example embodiment.

A processing system for executing method 200 is shown in a block high level architecture at 300 in FIG. 3. A dialog-to-service conversion/generation process is shown at 310, and may be stored on a computer readable storage device and run on one or more processors, either locally, remotely, or via a computer implemented cloud type of service where the process is run and interacted-with via a network. The dialogs to be converted are stored in the repository 320.

The process 310 operates on dialogs to create: procedure definitions at 340, service procedures at 330, and service wrappers at 350. The procedure definitions are stored in the program repository 320, as are the service procedures 330. The service wrappers 350 are deployed into an application server (not depicted in this diagram) by the user.

Figure 4:
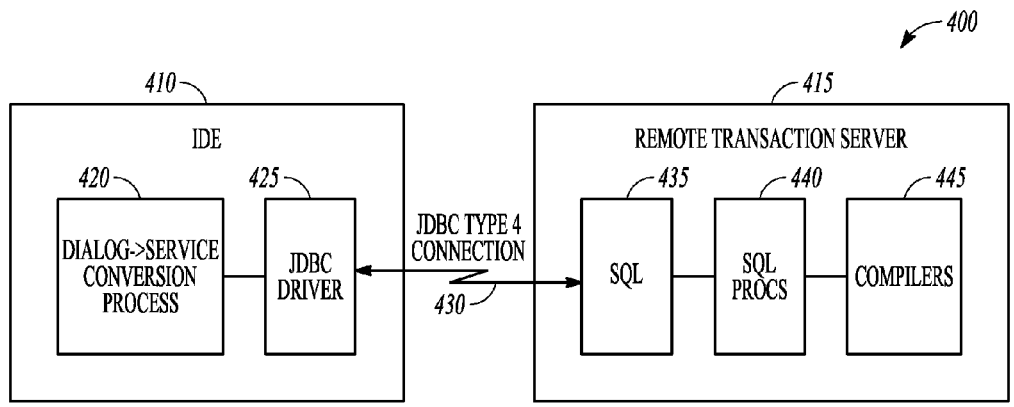
FIG. 4 is a block diagram of a communications architecture illustrating interaction between an integrated development environment and a remote transaction server according to an example embodiment.

FIG. 4 is a block diagram of a communications architecture 400 illustrating interaction between an integrated development environment (IDE) 410 and a remote transaction server 415 according to an example embodiment. IDE 410 in one embodiment corresponds to integrated development environment 110, and server 415 corresponds to remote transaction server 115, both of which are illustrated in FIG. 1. IDE 410 includes a dialog to service conversion process 420 that performs the method 200 for unbinding a dialog's business logic from the presentation-layer logic in a systematic, easy to use manner. A driver 425, such as a JDBC driver is a component that enables a Java® application to interact with a database. Other drivers may be used depending on the code used to implement different embodiments. Note that JDBC is not an acronym, but is a name used to refer to a database connection standard used by Java programs.

The driver uses a JDBC Type4 connection 430 to communicate with a database module 435 on remote transaction server 415. SQL interface module 435 in one embodiment is used to invoke one or more SQL Procedures 440, which in-turn communicate with the various compilers 445 to facilitate the downloading of process modules and compilation of the newly generated service procedure.

Figure 5A:
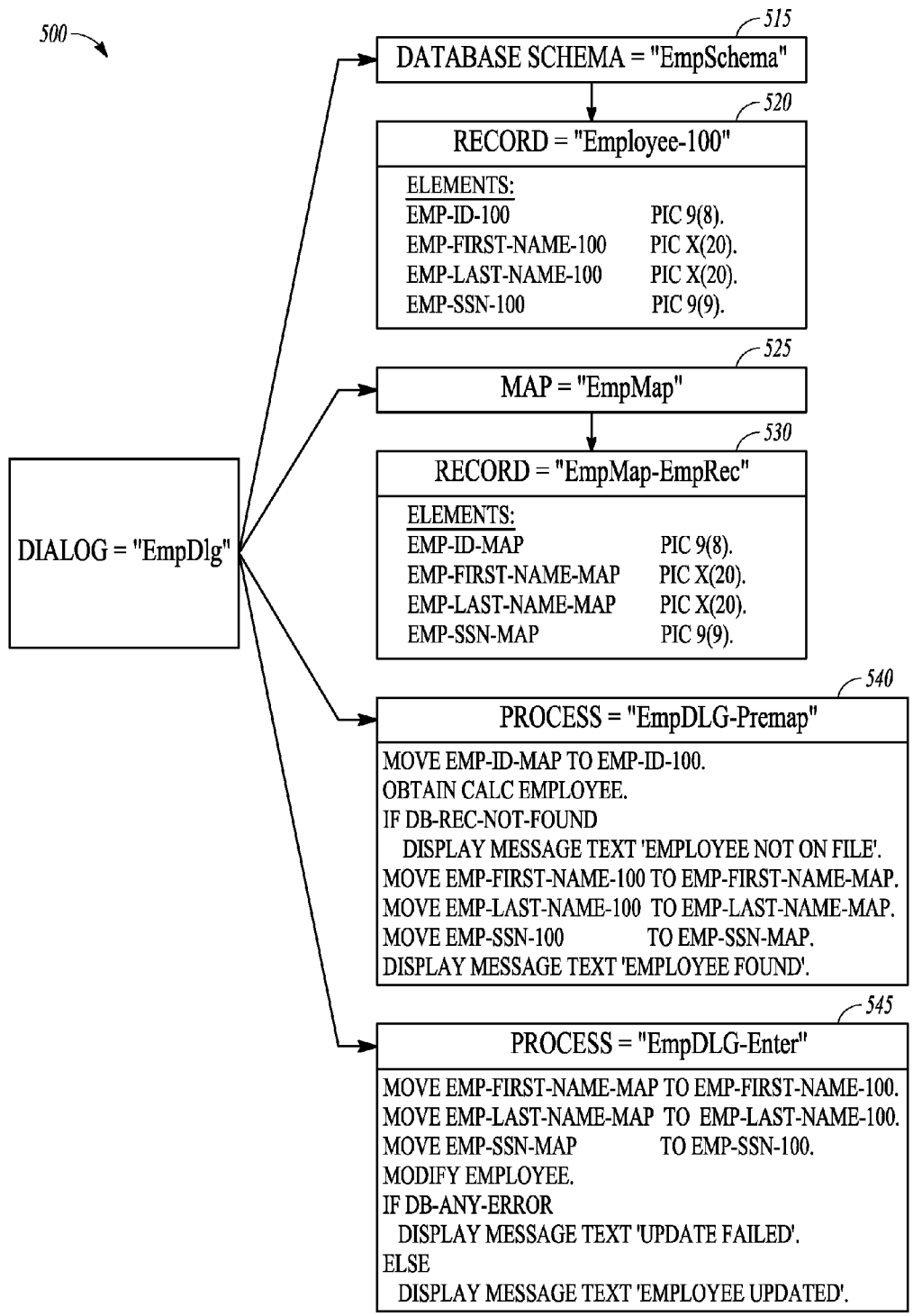
FIGS. 5A and 5B are diagrams illustrating a dialog prior to conversion and a service procedure after conversion according to an example embodiment.
Figure 5B:
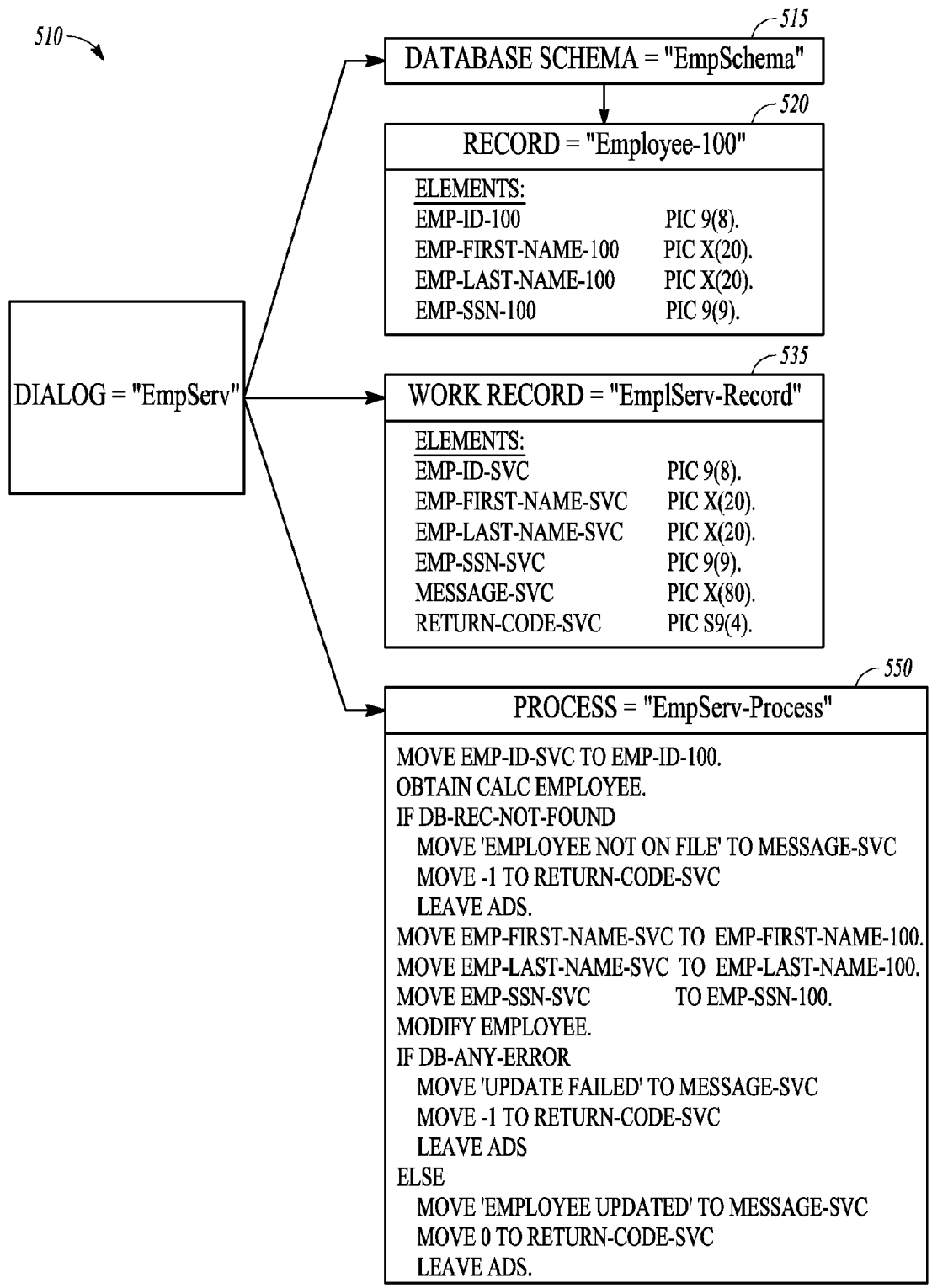

FIGS. 5A and 5B are diagrams illustrating a dialog 500 prior to conversion and a service procedure 510 after conversion according to an example embodiment. As indicated in both the dialog and service procedure figures, the "EmpSchema" database schema 515 is not changed. Nor, is the "Employee-100" record 520 changed, since both were compatible with the formats of both the dialog and the service procedure. A map 525 in the dialog 500 uses employee record 530. The newly created service procedure 510 contains no map, since it does not interact directly with the user. Map record "EmpMap-EmpRec" 530 used in the original map/dialog now becomes work record "EmplServ-Record" 535 in the new service procedure. The elements within work record "EmplServ-Record" are given a suffix of "SVC" for service, and two new elements are added to communicate any messages generated by the service as well as a return code.

Dialog 500 also includes two processes, a dialog premap process 540 and a dialog entry process 545. Each of these dialog processes has statements corresponding to the display of messages by a dumb terminal, such as "DISPLAY MESSAGE TEXT 'EMPLOYEE NOT ON FILE'", "DISPLAY MESSAGE TEXT 'EMPLOYEE FOUND'", "DISPLAY MESSAGE TEXT 'UPDATE FAILED'", and "DISPLAY MESSAGE TEXT 'EMPLOYEE UPDATED'". When the dialog procedures are converted, these DISPLAY commands are replaced by corresponding MOVE commands, which move the message text to the "MESSAGE-SCV" field, as seen in the single service procedure process 550. As part of the conversion of the DISPLAY commands, exit points are generated with the addition of "LEAVE ADS" statements. References to the old Map Record elements have been altered to reference the new Work Record elements as indicated at 535. Lastly, with guidance provided by the user, the process logic is streamlined to eliminate unnecessary MOVE statements in the new service procedure 510.

FIG. 6 illustrates a procedure definition 600 generated as a result of the conversion according to an example embodiment. Procedure definition 600 creates a procedure for updating employee records, and defines the data and data types that are used in the procedure. It also identifies an external name of "EMPSERVE", a protocol: "ADS", a mode for the procedure as "SYSTEM MODE", and also references local and global work areas.

FIG. 7 illustrates an example service wrapper 700 that is generated as a result of the conversion. This is a skeletal class that can either be incorporated into, or called directly, from a service-based application. Invocation of the backend service procedure is performed via the "CALL DEMOEMPL.EMP_ UPDATE(?, ?, ?, ?, ?, ?)" statement. Each of the parameters in the CALL statement are denoted by question marks ('?'), and correlate to the elements in the service procedure work record "EmplServ-Record" 535. The setting and registration of the parameters is performed by the "cstmt.set . . . " and "cstmt.registerOutParameter" method calls. Execution of the CALL statement is performed by the "cstmt.execute" call. On return from the call to the service procedure the "RETURN_CODE_SVC" field is returned in the local "rc" field, and an appropriate message is generated when any errors are detected.

Figure 8:
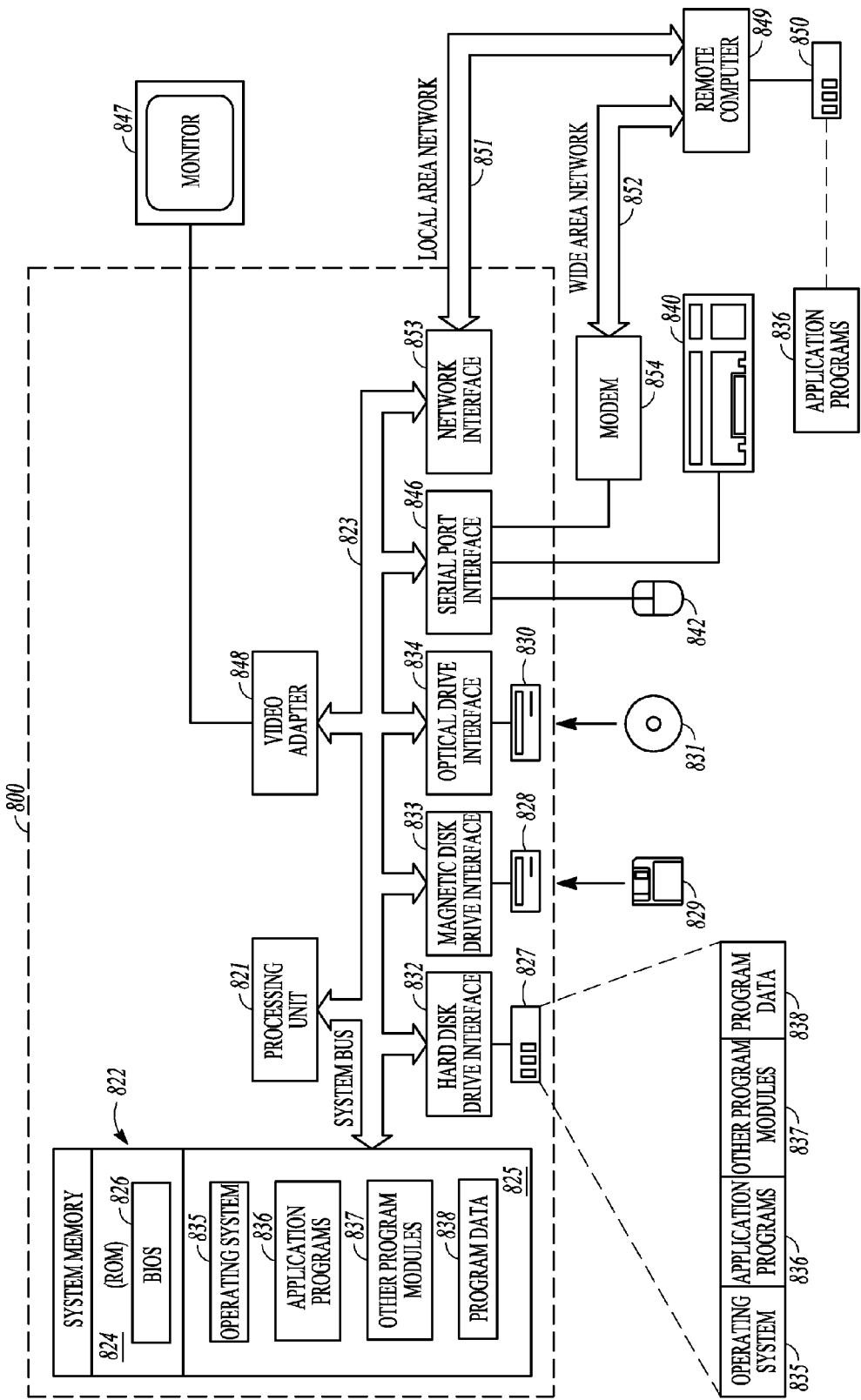
FIG. 8 is a block diagram of a computer system which may be used to perform the methods according to an example embodiment.

FIG. 8 is a block diagram of a computer system to implement methods according to an example embodiment. In the embodiment shown in FIG. 8, a hardware and operating environment is provided that is applicable to any of the systems, servers and/or remote clients shown in the other Figures. The computer system may be implemented as a single system, multiprocessor system, network cloud, or other type of system in various embodiments.

As shown in FIG. 8, one embodiment of the hardware and operating environment includes a general purpose computing device in the form of a computer 800 (e.g., a personal computer, workstation, or server), including one or more processing units 821, a system memory 822, and a system bus 823 that operatively couples various system components including the system memory 822 to the processing unit 821. There may be only one or there may be more than one processing unit 821, such that the processor of computer 800 comprises a single central-processing unit (CPU), or a plurality of processing units, commonly referred to as a multiprocessor or parallel-processor environment. In various embodiments, computer 800 is a conventional computer, a distributed computer, or any other type of computer.

The system bus 823 can be any of several types of bus structures including a memory bus or memory controller, a peripheral bus, and a local bus using any of a variety of bus architectures. The system memory can also be referred to as simply the memory, and, in some embodiments, includes read-only memory (ROM) 824 and random-access memory (RAM) 825. A basic input/output system (BIOS) program 826, containing the basic routines that help to transfer information between elements within the computer 800, such as during start-up, may be stored in ROM 824. The computer 800 further includes a hard disk drive 827 for reading from and writing to a hard disk, not shown, a magnetic disk drive 828 for reading from or writing to a removable magnetic disk 829, and an optical disk drive 830 for reading from or writing to a removable optical disk 831 such as a CD ROM or other optical media.

The hard disk drive 827, magnetic disk drive 828, and optical disk drive 830 couple with a hard disk drive interface 832, a magnetic disk drive interface 833, and an optical disk drive interface 834, respectively. The drives and their associated computer-readable media provide non volatile storage of computer-readable instructions, data structures, program modules and other data for the computer 800. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 829, optical disk 831, ROM 824, or RAM 825, including an operating system 835, one or more application programs 836, other program modules 837, and program data 838. Programming for implementing one or more processes or method described herein may be resident on any one or number of these computer-readable media.

A user may enter commands and information into computer 800 through input devices such as a keyboard 840 and pointing device 842. Other input devices (not shown) can include a microphone, joystick, game pad, satellite dish, scanner, or the like. These other input devices are often connected to the processing unit 821 through a serial port interface 846 that is coupled to the system bus 823, but can be connected by other interfaces, such as a parallel port, game port, or a universal serial bus (USB). A monitor 847 or other type of display device can also be connected to the system bus 823 via an interface, such as a video adapter 848. The monitor 847 can display a graphical user interface for the user. In addition to the monitor 847, computers typically include other peripheral output devices (not shown), such as speakers and printers.

The computer 800 may operate in a networked environment using logical connections to one or more remote computers or servers, such as remote computer 849. These logical connections are achieved by a communication device coupled to or a part of the computer 800; the invention is not limited to a particular type of communications device. The remote computer 849 can be another computer, a server, a router, a network PC, a client, a peer device or other common network node, and typically includes many or all of the elements described above I/O relative to the computer 800, although only a memory storage device 850 has been illustrated. The logical connections depicted in FIG. 8 include a local area network (LAN) 851 and/or a wide area network (WAN) 852. Such networking environments are commonplace in office networks, enterprise-wide computer networks, intranets and the internet, which are all types of networks.

When used in a LAN-networking environment, the computer 800 is connected to the LAN 851 through a network interface or adapter 853, which is one type of communications device. In some embodiments, when used in a WAN-networking environment, the computer 800 typically includes a modem 854 (another type of communications device) or any other type of communications device, e.g., a wireless transceiver, for establishing communications over the wide-area network 852, such as the internet. The modem 854, which may be internal or external, is connected to the system bus 823 via the serial port interface 846. In a networked environment, program modules depicted relative to the computer 800 can be stored in the remote memory storage device 850 of remote computer, or server 849.

It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

What is claimed is:

1. A computer implemented method comprising: accessing an application dialog from a computer readable storage device, wherein the application dialog contains process modules having interface operations and business logic; identifying process module commands via the computer that are invalid for a service and identifying options for remediation of such commands, wherein invalid commands comprise user interface operations, accept user input interactively, and transfer control out of the scope of a processing module, and wherein identified invalid process commands are presented to a user in an interactive manner with options for replacing the invalid process commands; compiling a completed process module that has invalid commands removed as a service procedure; creating a remote procedure definition and a service wrapper interface and storing them in a computer readable storage device.

2. The method of claim 1 wherein the service wrapper is useable to call the remote procedure.

3. The method of claim 1 wherein the service wrapper comprises a service wrapper interface stored in a program repository on an application server.

4. The method of claim 1 wherein the procedure definition is stored in a program repository on a remote transaction server.

5. The method of claim 1 wherein the service procedure is stored in a program repository on a remote transaction server.

6. The method of claim 1 wherein accessing an application dialog comprises displaying a list of application dialogs stored on the computer readable storage device.

7. The method of claim 1 wherein invalid commands comprise user interface operations for displaying information on a dumb terminal.

8. The method of claim 1 wherein invalid commands comprise presentation layer logic.

9. A non-transitory computer readable storage device storing instructions for causing a computer system to execute a method, the method comprising: accessing an application dialog, wherein the application dialog contains process modules having interface operations and business logic; identifying process module commands via the computer that are invalid for a service and identifying options for remediation of such commands, wherein invalid commands comprise user interface operations, accepting user input interactively, and transferring control out of the scope of a processing module, and wherein identified invalid process commands are presented to a user in an interactive manner with options for replacing the invalid process commands; compiling a completed process module that has invalid commands removed as a service procedure; creating a remote procedure definition and a service wrapper interface and storing them in a computer readable storage device.

10. The non-transitory computer readable storage device of claim 9 wherein the service wrapper is useable to call the remote procedure.

11. The non-transitory computer readable storage device of claim 9 wherein the service wrapper comprises a service wrapper interface stored in a program repository on an application server.

12. The non-transitory computer readable storage device of claim 9 wherein the remote procedure definition is stored in the program repository on a remote transaction server.

13. The non-transitory computer readable storage device of claim 9 wherein the service procedure is stored in a program repository on a remote transaction server.

14. The non-transitory computer readable storage device of claim 9 wherein accessing an application dialog comprises displaying a list of application dialogs stored on the computer readable storage device.

15. The non-transitory computer readable storage device of claim 9 wherein invalid commands comprise user interface operations for displaying information on a dumb terminal.

16. A system comprising: a processor; a memory device coupled to the processor; a process selection manager stored on the memory device to access an application dialog from a non-transitory computer readable storage device, wherein the application dialog contains process modules having interface operations and business logic; a process conversion manager stored on the memory device to identify process module commands via the computer that are invalid for a service and identifying options for remediation of such commands, wherein invalid commands comprise user interface operations, accept user input interactively, and transfer control out of the scope of a processing module, and wherein identified invalid process commands are presented to a user in an interactive manner with options for replacing the invalid process commands; a procedure generator stored on the memory device to compile a completed process module that has invalid commands removed as a service procedure and create a remote procedure definition; and a wrapper generator stored on the memory device to create service wrapper interface and store it in a computer readable storage device.

17. The system of claim 16 wherein the service wrapper is useable to call the remote procedure.

18. The system of claim 16 wherein the service wrapper comprises a service wrapper interface stored in a program repository on an application server, and wherein the remote procedure definition is stored in the program repository.

* * * * *